US005861893A

United States Patent [19]

Sturgess

[11] Patent Number: 5,861,893

[45] Date of Patent: Jan. 19, 1999

[54] SYSTEM AND METHOD FOR GRAPHICS DATA CONCURRENCY AND COHERENCY

[75] Inventor: Jay J. Sturgess, Orangevale, Calif.

[73] Assignee: Intel Corporation, Santa Clara, Calif.

[21] Appl. No.: 864,553

[22] Filed: May 27, 1997

[51] Int. Cl.[6] .................... G06F 13/00

[52] U.S. Cl. .................... 345/525; 345/513; 345/522

[58] Field of Search .................... 345/501, 507, 345/513, 524, 525, 521, 522, 514

[56] References Cited

U.S. PATENT DOCUMENTS 5,668,941 9/1997 Noorbakhsh .................... 345/625

5,671,401 9/1997 Harrell .................... 345/505

*Primary Examiner*—Kee M. Tung

*Attorney, Agent, or Firm*—Leo V. Novakoski

[57] ABSTRACT

A graphics controller enhances concurrency among multiple pipelines, provides high throughput to graphics resources between 2D and 3D pipelines spawned by an application, and provides low latency for 2D pipelines spawned by an operating system. The graphics controller includes a command parser, arbitration logic, a BLTBIT engine having first and second operating registers. Graphics commands from the application are routed through the command processor, while graphics commands from the operating system are written to the second operating register. Access signaling bits associated with each operating register for communicating between the arbitration logic and the application and operating system. Graphics commands from application-spawned pipelines are coupled through the command parser to specified graphics resources, including the first operating register. An arbitration scheme assigns higher priority to BLTBIT engine accesses initiated by pipelines spawned by the operating system.

14 Claims, 6 Drawing Sheets

SYSTEM AND METHOD FOR GRAPHICS DATA CONCURRENCY AND COHERENCY

BACKGROUND OF THE INVENTION

1. Technical Field

This invention relates to the field of graphics systems and in particular to systems and methods for arbitrating between two and three dimensional graphics pipelines for access to graphics resources.

2. Background Art

Graphics capabilities are becoming increasingly important in modem computer systems. For example, most currently available operating systems communicate with computer users through graphical user interfaces (GUIs). In order to operate effectively, GUIs require a low latency path to graphics resources.

In addition to GUIs, computer systems must also support the graphics demands of game, drawing, video, and computer aided design/engineering (CAD/CAE) applications (hereafter, "applications") that run under the operating system. Until recently, the graphics generated by most popular applications were largely two dimensional ("2D") in nature, but increasingly, these applications are incorporating three dimensional ("3D") graphics features. Here, 2D graphics refers to substantially flat images that are generated through a series of processing steps known as a 2D pipeline. The 2D pipeline typically includes 2D scaling, block transfer and raster operations, as well as color blending and selection steps. These steps/operations are implemented by some combination of hardware and software. 3D graphics refers to images that are derived from three dimensional mathematics, and which are given a 3D appearance through, for example, lighting and texturing techniques. The series of processing steps used to generate 3D graphics form a 3D pipeline.

2D and 3D graphics place substantial demands on the resources of a computer system, and these systems often include graphics subsystems to perform some of the processing steps that would otherwise be performed by the central processor ("host processor"). The graphics subsystem and host processor of such systems must be coordinated to synchronize access to graphics resources. For example, a 2D pipeline generating GUI images for the operating system competes for graphics resources with 2D and 3D pipelines generating images for applications running under the operating system. Arbitration among these competing pipelines for access to graphics resources must accommodate the low latency requirements of the operating system and the high throughput requirements of the application graphics.

Synchronization is particularly complicated in preemptive, multi-threaded operating systems like Windows™ 95 and Windows™ NT from Microsoft® Corporation. These operating systems allow multiple execution threads from one or more programs, including the operating system, to run concurrently. Each thread can spawn a pipeline, and each pipeline can access the graphics subsystem through one of several application programming interfaces ("APIs"), depending on the resources it requires. Resource requirements are determined in part by whether a thread spawns a 2D or 3D pipeline, and the response time (maximum latency) required by the thread. With multiple pipelines accessing the graphics subsystem through multiple APIs, the demands placed on the graphics subsystem for rapid, seamless response without contention are substantially increased.

Conventional systems employ a variety of strategies to handle graphics data from different pipelines. In one strategy, the operating system implements a semaphore to limit access to the graphics subsystem to one pipeline at a time. Since graphics controllers may include different resources that could be used concurrently by pipelines at different processing stages, this strategy reduces the efficiency of the graphics controller. Another strategy employs separate controllers for 2D and 3D graphics pipelines. Semaphores are still necessary in these systems to regulate access to each controller by contending pipelines, and additional signals are required to prevent contention between concurrent 2D and 3D pipelines for graphics memory locations. None of these strategies guarantees a low latency channel to graphics resources for the operating system.

There is thus a need for a system and method for enhancing concurrent access to graphics resources and for coordinating these accesses to provide the low latency required for graphics pipelines spawned by the operating system.

SUMMARY OF THE INVENTION

The present invention is a system and method for coordinating access to graphics resources among 2D and 3D pipelines spawned by execution threads on a host processor. A graphics controller is provided to arbitrate among 2D and 3D pipelines for access to graphics resources in a manner that enhances concurrent processing of the 2D and 3D pipelines, while providing low latency access for pipelines originating with the operating system.

In accordance with the present invention, a graphics controller coordinates access to graphics resources, including a block level transfer engine for bits, i.e. a BLTBIT engine, having first and second operating registers. Selected commands from an application-spawned pipeline are routed to the first operating register through a command parser, while commands from an operating system-spawned pipeline are routed to the second operating register. Access signaling bits associated with the first and second operating registers are coupled to arbitration logic, for communicating between the arbitration logic and the pipelines.

BRIEF DESCRIPTION OF THE DRAWINGS

The present invention is illustrated by way of example in the following drawings in which like references indicate similar elements. These drawings disclose various embodiments of the invention for purposes of illustration only and are not intended to limit the scope of the invention.

DETAILED DESCRIPTION OF THE INVENTION

Figure 1:
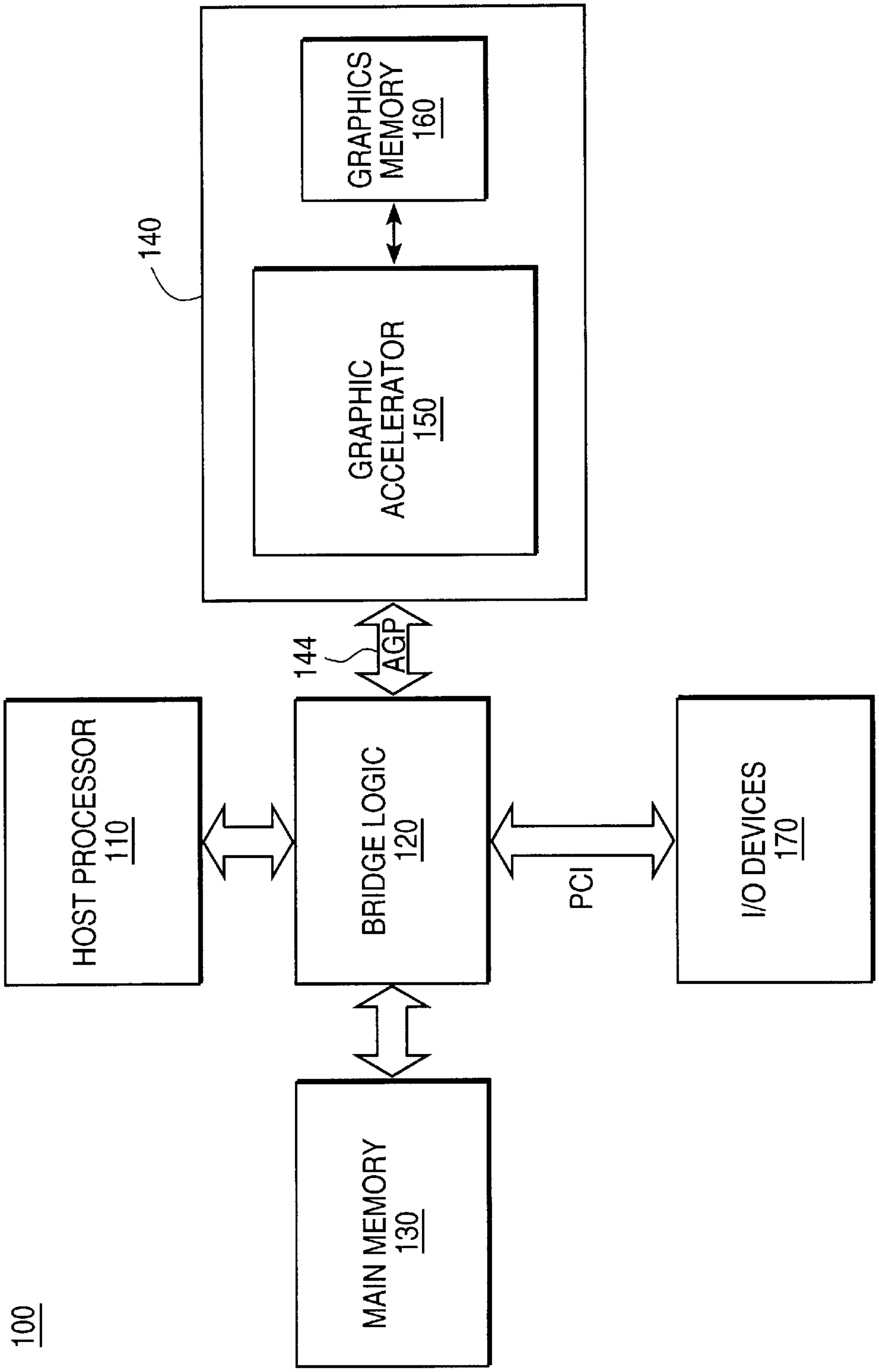
FIG. 1 is a block diagram of one embodiment of a computer system that includes a graphics controller in accordance with the present invention.

The following detailed description sets forth numerous specific details to provide a thorough understanding of the invention. However, those of ordinary skill in the art will appreciate that the invention may be practiced without these specific details. In other instances, well known methods, procedures, components, and circuits have not been described in detail in order to more clearly highlight the features of the present invention.

The present invention is a system and method for efficiently processing graphics commands and/or data (hereafter, "commands") from multiple graphics pipelines. In particular, a graphics controller provides high throughput access to graphics resources for pipelines spawned by an application, as well as low latency access to graphics resources for pipelines spawned by the operating system.

A graphics controller in accordance with the present invention comprises command parsing logic, arbitration logic, and graphics resources, including a BLTBIT engine having first and second operating registers for graphics pipelines spawned by applications and the operating system, respectively. The command parsing logic coordinates instructions from 2D and 3D pipelines to allow concurrent processing of non-contending commands. For example, the command parser allows the 3D pipeline to process texture data while the 2D pipeline block transfers ("BLTs") data between memory locations, provided the texture buffer does not overlap with the graphics memory surfaces being transferred.

The arbitration logic of the present invention coordinates BLT operations between s pipelines spawned by the operating system and applications running under the operating system. BLTs are processing steps in a 2D pipeline that are implemented through application programming interfaces (APIs) provided by the operating system. Typically, the operating system and application employ different APIs to communicate with graphics resources. This enhances the opportunities for concurrent operations and allows arbitration to be implemented at the graphics controller level. For example, the graphics display interface (GDI) is optimized to provide low latency interactivity between the GUI and the windows management system. However, unless the graphics subsystem hardware supports low latency accesses, the benefits of an optimized GDI will not translate into rapid system response. This issue is addressed by the present invention.

Separate memory mapped input buffers in the graphics controller couple commands to graphic resources by data paths having different latency and throughput characteristics. One memory mapped buffer forms the first operating register of the BLTBIT engine. Request/grant bits associated with this register are coupled to the arbitration logic for requesting access to the BLTBIT engine. Operating system threads access the BLTBIT engine by setting the request bit and writing commands to the register. The contents of this register are gated to the BLTBIT engine by the arbitration logic without recourse to the command parser logic.

Applications access graphics resources, including the second operating register for the BLTBIT engine, through a separate memory mapped buffer that routes commands through the command parser. A second operating register associated with the BLTBIT engine is provided for BLT commands originating with the application. Request/grant bits associated with the second operating register allow the command parser to arbitrate for access to the BLTBIT engine on behalf of the application. Arbitration for the BLTBIT engine occurs on command boundaries. In one embodiment, the arbitration logic assigns higher priority to requests associated with the operating system buffer (the first operating register) to provide the operating system with low latency access to the BLTBIT engine.

Referring first to FIG. 1, there is shown a block diagram of one embodiment of a computer system 100 including a graphics subsystem 140 in accordance with the present invention. Computer system 100 is provided for illustration and represents just one of a number of system configurations in which the present invention may be implemented. Computer system 100 comprises a host processor 110, bridge logic 120, main memory 130, graphics subsystem 140, and optional I/O devices 170. Bridge logic 120 couples data among host processor 110, main memory 130, graphics subsystem 140, and I/O devices 170. Graphics subsystem 140, which is coupled to bridge logic 120 through an interconnect 144, includes a graphics controller 150 and graphics memory 160. Graphics memory 160 is typically divided into multiple memory surfaces (not shown) where graphics data may be stored for image composition and display. In one embodiment of the invention, interconnect 144 is an Advanced Graphics Port (A.G.P.) which is described, for example, in Accelerated Graphics Port Interface Specification, Revision 1.0, published on Jul. 13, 1996 by Intel Corporation.

Graphics controller 150 acts as an interface between graphics memory 160 and the other elements of computer system 100. In particular, graphic controller 150 includes graphics resources 340 (FIG. 3) to accelerate selected processing steps in 2D and 3D pipelines, as well as logic to coordinate access to these resources by the different pipelines. In the disclosed embodiment, the pipelines are spawned by threads executing on host processor 110. Modern operating systems, such as the Windows operating systems discussed below, provide APIs to facilitate transactions between these execution threads and graphics subsystem 140.

Various process steps in a pipelines may be implemented by host processor 110, while other process steps may be implemented by graphics controller 150. The processing steps may be distributed differently between hardware and software implementations, depending on the resources of computer system 100 and graphics controllers 150.

For a 3D pipeline, the main processing steps are: geometry transformations, which convert 3D coordinates to screen, i.e. 2D, coordinates; lighting calculations, which determine the color of polygon surfaces based on the light sources in the scene; and rendering, which draws the polygons into graphics memory. Graphics commands that initiate and control these processing steps and the data on which the commands operate are specified in a data structure called the execute buffer. The 3D pipeline thus represents the processes specified by the commands in the execute buffer.

Graphics controller 150 coordinates access to graphics memory 160 by the 2D and 3D pipelines in a manner that enhances the concurrency of these pipelines, while preserving a high priority path to graphics memory 160 for the operating system. The operating system uses the latter path to manage the windowing system, mouse movements, and other functions that require low latency access to the resources of graphics controller 150.

In the following discussion, the invention is described with respect to various application programming interfaces (APIs) supported in the Windows™ 95 and NT operating systems of Microsoft® Corporation. The APIs of interest are those that serve as interfaces to the graphics hardware and are discussed in detail below. It is noted, however, that the invention is not limited to use with Windows operating systems or their APIs. The present invention may be used to advantage with any operating systems that support independent 2D and 3D pipelines and provide access to graphics hardware for these pipelines through multiple APIs.

Figure 2:
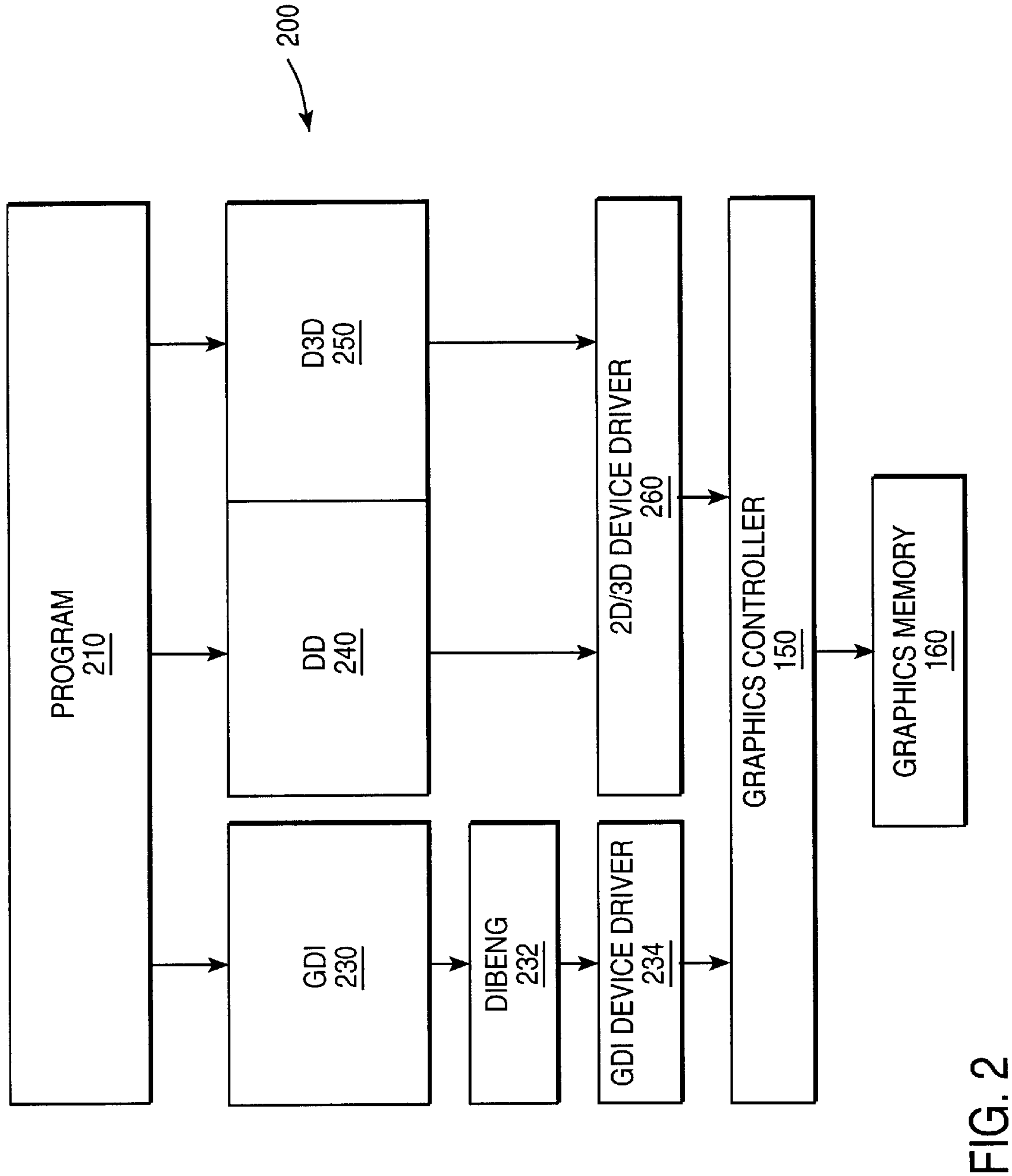
FIG. 2 is a block diagram showing the different APIs that may be used by programs running on a host processor to access the graphics controller of FIG. 1.

Referring now to FIG. 2, there is shown a block diagram indicating the relationships among various graphics APIs 200 of the Windows operating systems, a program 210 (application or operating system), and graphics controller 150. Among these APIs are a Graphics Device Interface™ API ("GDI") 230, a DirectDraw™ API ("DD") 240, and a Direct3D™ API ("D3D") 250. The latter two APIs are components of the DirectX™ Interface for graphics hardware, which are designed to provide relatively direct access to graphics controller 150 for applications running under Windows operating systems.

Executing threads use DD 240 to manage graphics memory 160 and to transfer data among the memory surfaces (not shown) of graphic memory 160. Graphics memory 160 typically includes a primary surface (front buffer), secondary surface (back buffer for double buffering), and other secondary surfaces that are defined through DD 240 for use by different processing steps of a graphics pipeline. For example, a Z buffer may be defined for sorting pixel data according to the depth at which an image element appears in a 3D image. A texture buffer may be defined for storing data that is subsequently mapped onto polygons to create a 3D surface, and an overlay buffer may be defined for storing an image that is subsequently combined with other images generated by a pipeline. DD 240 manages the various memory surfaces in a manner that is largely transparent to application 210.

DD 240 also provides functions for transferring data blocks between different surfaces of graphics memory 160 and for flipping the active video area, i.e. the area currently displayed on the monitor, between different surfaces. The latter process, which is called double buffering, is well known in the art of graphics management. Block transfer functions are implemented by a BLTBIT engine, which is accessed through graphics controller 150 (FIG. 1).

GDI 230 provides a relatively hardware-independent interface to graphics controller 150 and, in particular, to the BLTBIT engine of graphics controller 150. Hardware independence is accomplished through a device independent bitmap (DIB) engine 232 and a GDI driver interface (DDI) 234, which provide software implementations for many of the processes in a typical 2D process pipeline. In general, software implementations of 2D pipeline steps are slower than hardware implementations of the same steps, because the latter employ logic dedicated to the processing steps. On the other hand, software implementations are more easily ported to different computer systems, and, for this reason, GDI 230 is the principle API used by the Windows operating systems for GUI management. GUI management involves relatively predictable changes to standard icons, and GDI 230 provides more than adequate performance, provided it has low latency access the BLTBIT engine. One feature of graphics controller 150 is the low latency access it provides for pipelines spawned by the operating system.

Application threads that generate 3D images use D3D 250 to implement process steps for the 3D pipeline. These process steps include defining a view for a scene, lighting objects in a scene, locating objects in a scene (coordinate transformation), and defining the reflective properties of an object (texture). A 2D/3D DD1260 represents a hardware abstraction/emulation layer that determines which pipeline steps can be implemented by graphics controller 250 and which must be implemented in software, e.g. by host processor 110.

Figure 3A:
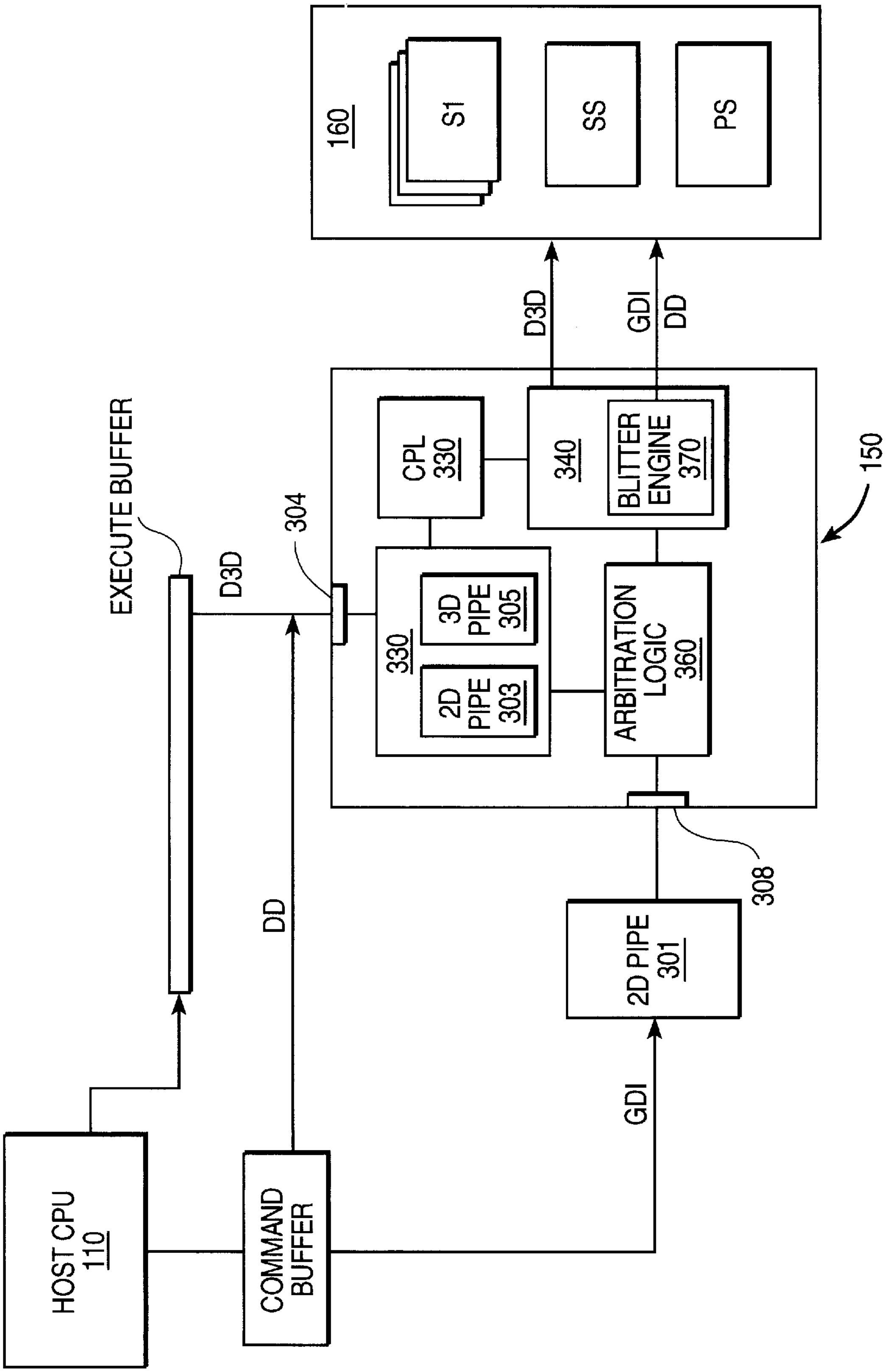
FIG. 3A is a representation of the interaction between a host processor and the graphics controller of FIG. 1 via 2D and 3D pipelines.

Referring now to FIG. 3A, there is shown a representation of 2D pipelines 301, 303, 3D pipeline 305, and their relationships to host processor 110 and graphics controller 150. In the disclosed embodiment, 2D pipelines 301, 303 to graphics controller 150 are shown as being implemented through GDI 230 and DD 240, respectively, and 3D pipeline 305 is shown as being implemented through D3D 250. While this configuration of APIs, applications, and drivers is typical in a Windows-based computer system, it is not necessary to the operation of the present invention. Graphics software based on other standards, e.g. OpenGL™, Quicktime™, Active Movie™, may be used in conjunction with the present invention.

Graphics controller 150 coordinates the access of 2D pipelines 301, 303 and 3D pipeline 305 to resources 340, including a BLTBIT engine 370. This is accomplished through a combination of arbitration logic 360, command parser logic ("command parser") 330, and first and second operating registers (not shown) accessed through memory mapped buffers 304 and 308, respectively.

Arbitration logic 360 implements an access protocol that provides the operating system with low latency access to BLTBIT engine 370 through memory mapped buffer 308. High throughput access to graphics resources is provided through memory mapped buffer 304. Buffer 304 couples 2D and 3D pipeline commands from an application to command parser 330, which routes the commands to graphics resources 340. Command parser 330 allows 2D and 3D instructions to be implemented concurrently as long as they are not targeted to the same graphics resource.

Figure 3B:
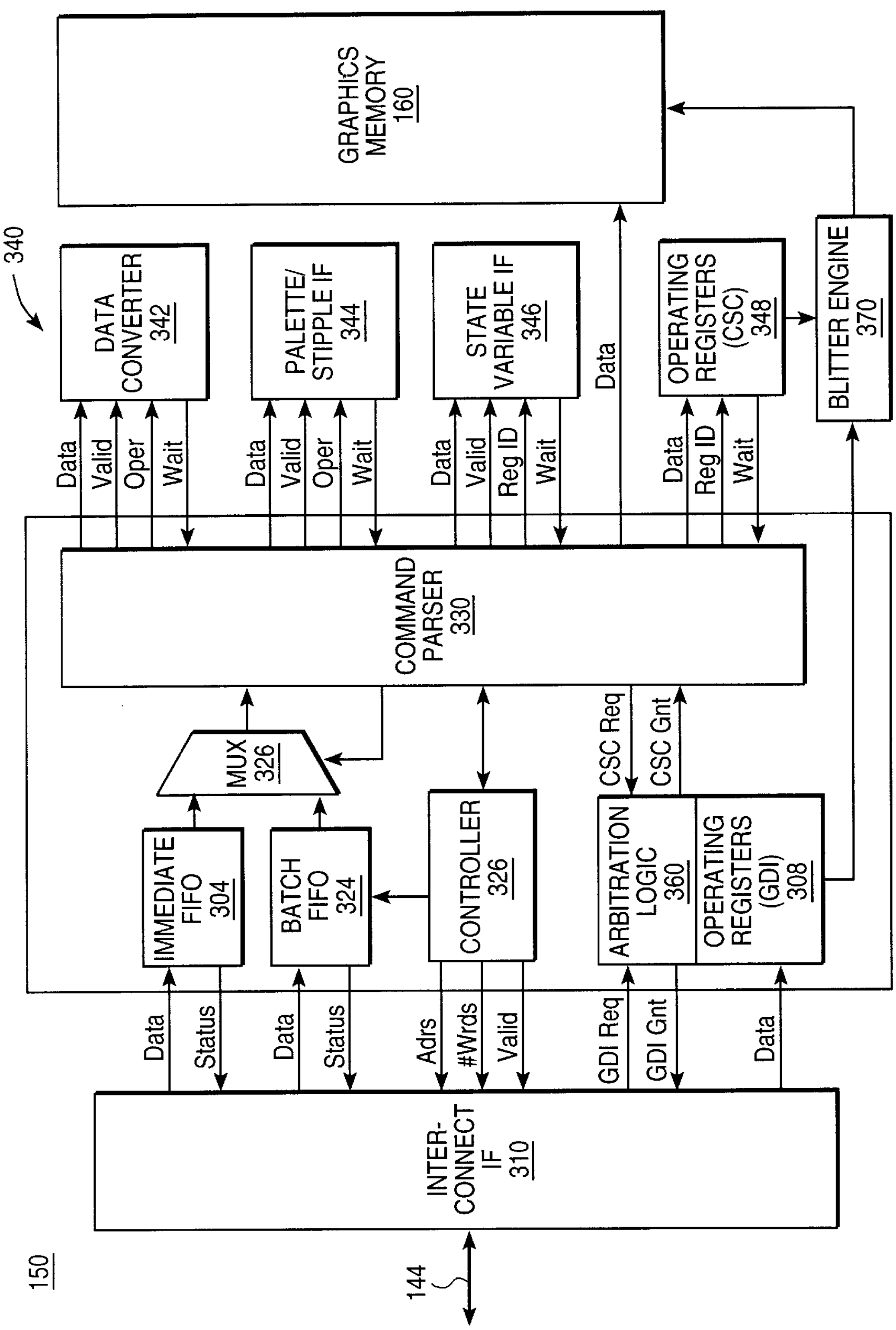
FIG. 3B is a block diagram of one embodiment of a graphics controller in accordance with the present invention.

Referring now to FIG. 3B, there is shown a detailed block diagram of one embodiment of graphics controller 150 in accordance with the present invention. Graphics controller 150 comprises buffers 304, 308, 324, command parser 330, graphics resources 340, and arbitration logic 360. In the disclosed embodiment, graphics resources 340 include a data converter 342, a palette/stipple memory 344, a state variable pipeline 346, an buffer 348, and BLTBIT engine 370. In this embodiment, buffer 308 serves as a first operating register for BLTBIT engine 370, while buffer 348 serves as a second operating register for BLTBIT engine 370.

BLTBIT engine 370 is coupled to operating registers 308 and 348, which control its operation according to received graphics commands. In the disclosed embodiment, operating register 308 receives graphics commands from the 2D pipeline spawned by the operating system, and operating register 348 receives graphics commands from the 2D pipeline spawned by an application. In one embodiment of the invention, the operating system uses GDI 230 to write 2D graphics commands to operating register 308. In another embodiment, the application uses DD 240 to write graphics commands to buffer 304. BLTBIT commands are routed to operating register 348 through command parser 330.

In the disclosed embodiment, buffers 304 and 324 are an immediate FIFO and a batch FIFO, respectively, that are coupled to command parser 330 through a mutliplexer (MUX) 326. Buffers 304, 308 are accessed by executing threads through memory mapped I/O using interconnect 144. A batch FIFO controller 326 coupled to FIFO 324 allows command parser 330 to initiate graphics command transfers via direct memory accesses (DMA) to FIFO 324.

Commands from 2D and 3D pipelines spawned by an application(s) are coupled to command parser 330 through buffers 304, 324. The commands include a header that specifies a client (targeted resource), an opcode (function to be performed), and a data type. Data to be processed, e.g. vertex tables for polygons, may be identified by a pointer to the data or it may be appended to the header. Command parser 330 interprets the header and routes the associated data to the indicated graphics resource 340 for processing in accordance with the specified opcode. 3D graphics commands may specify, for example, real to floating point conversion on vertex data (module 342), color space conversion (YUV to RGB format) or logical operations on pixel data (module 344). Other commands may specify loading texture data into an area of graphics memory (buffer 348).

2D graphics commands are also handled by command parser 330. This makes higher throughputs possible, since command parser 330 can process non-contending 2D and 3D commands concurrently. 2D commands may include, for example, color conversion, floating point conversion, and palette operations. In addition, 2D operands may be sent to operating register 348 to transfer blocks of data among graphics and main memory locations using BLTBIT engine 370.

Operating register(buffer) 308 is written by threads spawned by the operating system, without recourse to command parser 330. The operating system typically uses GDI 230 for windows management, and the corresponding commands in the 2D pipeline require low latency to prevent jumpy cursor movements, tracing in menus, delays in drawing windows, and the like. In order to access BLTBIT engine 370, the operating system sets a request (REQ) bit 422 (FIG. 4) associated with buffer 308 and monitors a corresponding grant (GRT) bit 424. REQ bit 422 and GRT bit 424 are coupled to arbitration logic 360. When arbitration logic 360 detects REQ bit 422 set, it checks a BLTBIT engine available signal (not shown) and sets grant (GRT) bit 424 when BLTBIT engine 370 is available. Commands written to operating register 308 are then gated to BLTBIT engine 370 for processing, e.g. transferring data to the primary memory surface or one of the secondary memory surfaces. The transferred bits may be memory mapped and may be made cacheable to improve system performance.

Operating register 348 is written by an application through command parser 330. For example, a request (REQ) bit 442 and a grant (GRT) bit 444 are associated with operating register 348. In one embodiment of the invention, when command parser 330 detects a 2D command to BLTBIT engine 370, it transfers the associated data pointer to operating register 348, sets REQ bit 442 and monitors GRT bit 444. REQ/GRT bits 442, 444 are also coupled to arbitration logic 360, which checks a BLTBIT engine busy signal and REQ 422 before granting access to command parser 330. If either signal is set, arbitration logic 360 will not set GRT bit 444. If neither signal is set, arbitration logic 360 sets GRT bit 444 and gates the contents of operating register 348 to BLTBIT engine 370.

Figure 4:
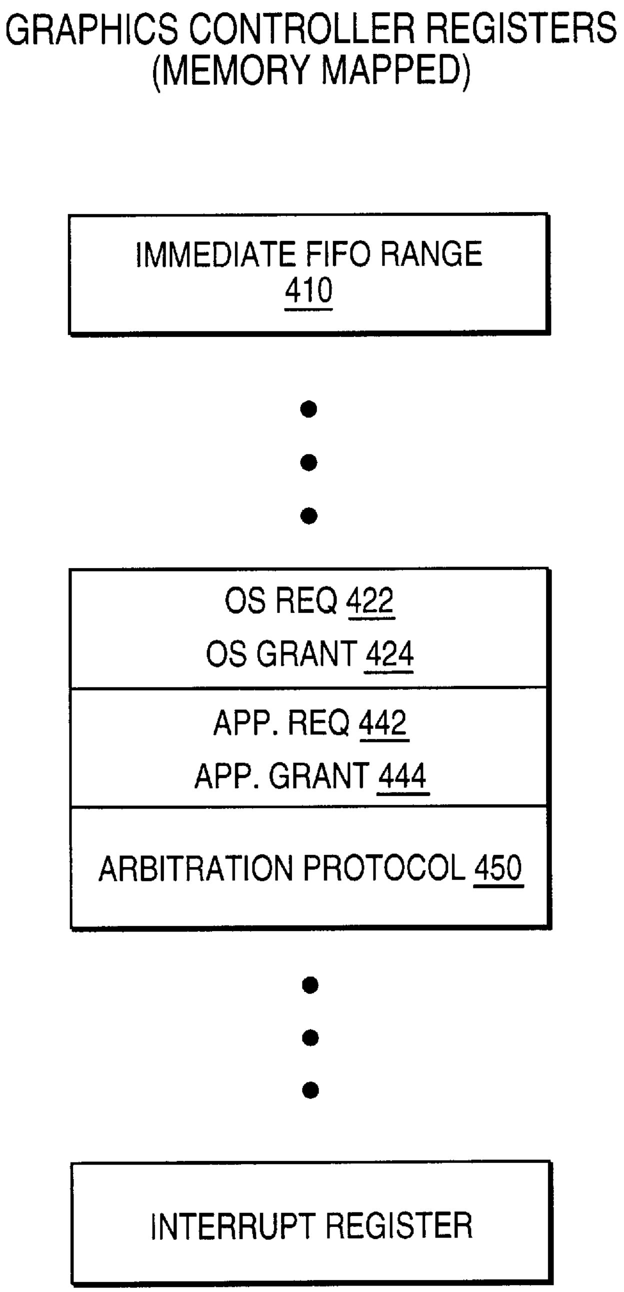
FIG. 4 is a block diagram of the registers used to communicate graphics commands from 2D and 3D pipelines to the graphics controller of FIG. 3.

Referring now to FIG. 4 there is shown a representation of registers 400 used to support memory mapped I/O for graphics controller 150. Graphics commands from pipelines spawned by applications are written to immediate FIFO register location 410. 2D pipelines spawned by the operating system request access to BLTBIT engine 370 through REQ bit 422 and monitors GRT bit 424 for an indication that access has been granted. 2D pipelines spawned by an application are written to FIFO register location 410 and interpreted by command parser 330. Command parser 330 sets REQ bit 442 when a BLTBIT operation is detected and monitors GRT bit 44 for an indication that access has been granted to BLTBIT engine 370.

In one embodiment of the present invention, arbitration logic 360 checks a BLTBIT engine busy signal when either REQ bit is set and sets the corresponding grant bit when BLTBIT engine 370 is available. In order to provide a low latency path to graphics memory 150 for operating system spawned pipelines, arbitration logic 360 grants access to the operating system when REQ bits 424 and 444 are set concurrently.

Additional graphics controller registers 400 may be provided to modify the operation of arbitration logic 360. For example, an arbitration protocol register 450 may be included to disable either REQ bit 422 or REQ bit 442register.

Figure 5:
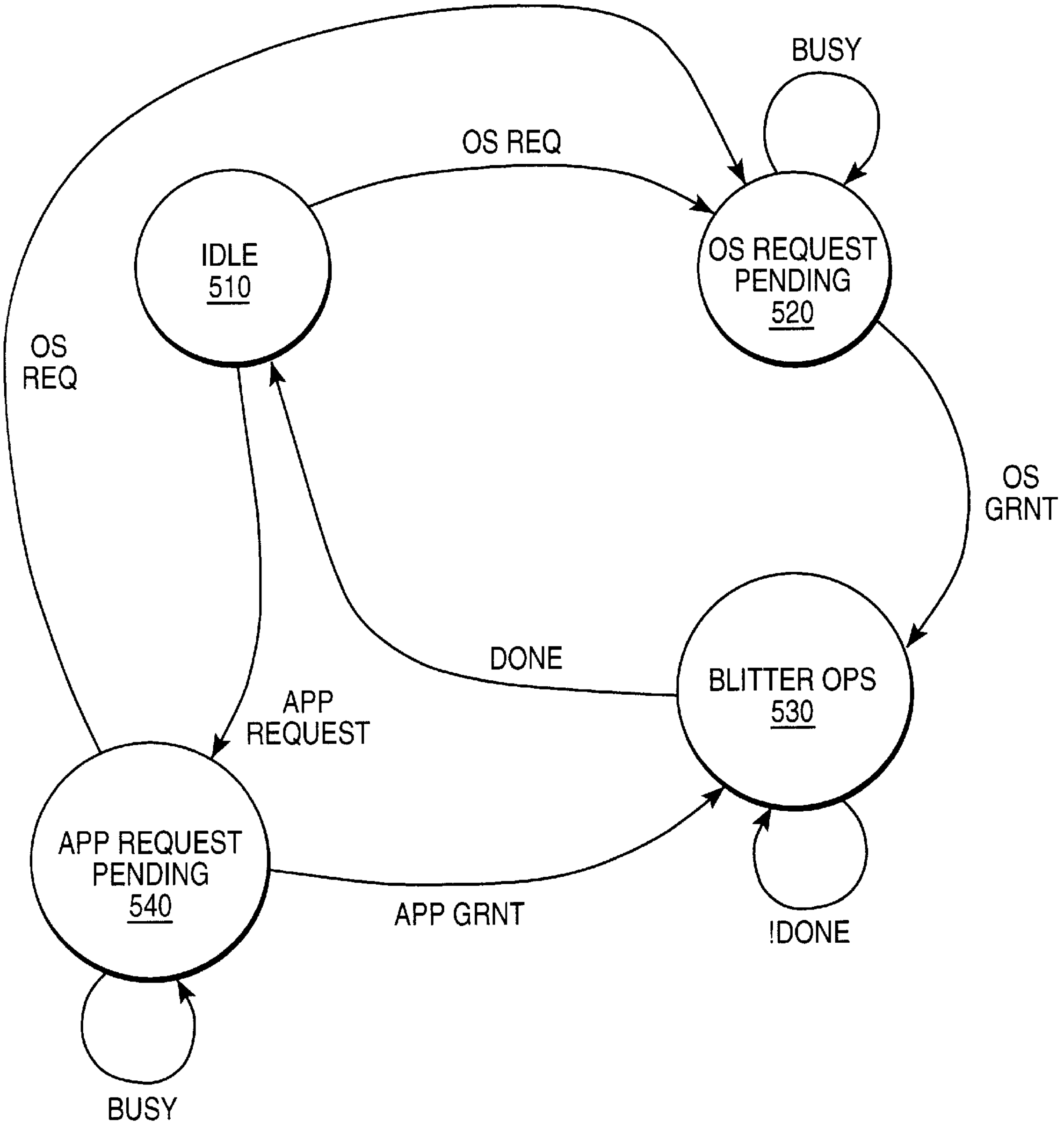
FIG. 5 is a state machine for implementing an arbitration scheme for coordinating access to graphics resources in accordance with the present invention.

Referring now to FIG. 5, there is shown a state machine implemented by arbitration logic 360 of by graphics controller 150 to provide low latency for pipelines spawned by the operating system. In idle state 510, state machine 500 can respond to assertion of REQ bits 422, 424 by the operating system or an application, respectively. When REQ bit 422 is asserted, state machine 500 transitions to state 520, OS REQ PENDING, where availability of BLTBIT engine 370 is checked. State machine 500 remains in state 520 if BLTBIT engine 370 is busy, and transitions to BLTBIT OPS state 530 when BLTBIT engine 370 becomes available. In state 530, the pipeline spawned by the operating system can implement its BLTBIT operations and transition back to IDLE state 510 when done.

When REQ bit 242 is asserted, i.e. APP REQ, state machine 500 transitions to APP REQ PENDING state 540. In order to provide low latency for commands from the operating system, state machine 500 will transition from state 540 to state 520 (OS REQ PENDING) if REQ bit 422 is set before GRT bit 444 is set. If no operating system request intervenes, state machine 500 remains in state 540 until GRT bit 444 is set. When GRT bit 444 is set, state machine 500 transitions to state 530, allowing the application pipeline to complete its BLTBIT command. When its completed (DONE), state machine transitions back to idle state 510.

There has thus been provided a system and method for synchronizing access by multiple pipelines to the graphics resources of a graphics controller in coordination with a host processor. The graphics controller provides separate pathways for commands from the operating system and concurrently running application programs. Command parser logic coordinates access to graphics resources to promote concurrent operations for 2D and 3D pipelines spawned by an application. Arbitration logic arbitrates access to an included BLTBIT engine between pipelines spawned by the application and the operating system. The graphics controller provides high throughput access for pipelines spawned by applications and low latency for pipelines spawned by the operating system.

The present invention has been described with reference to specific examples and embodiments solely for purposes of illustration. Persons skilled in the art, having the benefit of this disclosure, will recognize additional variations within the spirit and scope of the present invention, which is limited only by the appended claims.

What is claimed is:

1. A graphics controller for coordinating access to graphics resources, the graphics controller comprising:

a command parser coupled to interpret a command received from an application and route the command to an indicated graphics resource;

a first operating register coupled to receive a command from an operating system;

a second operating register coupled to the command parser for receiving the command from the application;

a BLTBIT engine coupled to the first and second operating registers for transferring data between memory locations according to commands received at the first and second operating registers; and arbitration logic coupled to the first and second operating registers for gating commands from the first and second operating registers to the BLTBIT engine according to access signals associated with the first and second operating registers.

2. The graphics controller of claim 1, further comprising a buffer coupled to the command parser for coupling commands from the application to the graphics controller.

3. The graphics controller of claim 1, wherein the first operating register forms a buffer for receiving commands from the operating system.

4. The graphics controller of claim 1, wherein the arbitration logic further comprises:

a first set of request/grant bits associated with the first operating register for controlling access to the BLTBIT engine through the first operating register; and a second set of request/grant bits associated with the second operating register for controlling access to the BLTBIT engine through the second operating register.

5. The graphics controller of claim 4, wherein the first and second sets of request/grant bits are memory mapped.

6. The graphics controller of claim 4, wherein the first set of request/grant bits is assigned a higher priority than the second set of request/grant bits.

7. The graphics controller of claim 4, wherein the command parser reads and writes the second set of request/grant bits on behalf of the application.

8. A graphics controller for coordinating access to graphics resources by multiple pipelines executing on a host processor that is coupled to the graphics controller, the graphics controller comprising:

a BLTBIT engine for transferring data between memory locations according to commands provided by an operating system and an application;

first and second operating registers coupled to the BLTBIT engine, for receiving commands from the operating system and application, respectively;

arbitration logic coupled to the first and second operating registers for granting access to the BLTBIT engine according to access signals provided by the application and operating system; and first and second sets of request/grant bits associated with the first and second operating registers, respectively, and coupled to the arbitration logic for registering access signals generated by the application and operating system, respectively and by the arbitration logic.

9. The graphics controller of claim 8, further comprising;

a buffer for receiving commands from the application; and a command parser coupled to the buffer and the second operating register, for routing selected commands received at the buffer to the second operating register.

10. The graphics controller of claim 9, wherein the command parser is further coupled to the second set of request/grant bits, for signaling to the arbitration logic when a command from the application requires access to the BLTBIT engine.

11. A graphics controller for processing graphics commands from an application program and an operating system running on a host processor that is coupled to the graphics controller, the graphics controller comprising:

a command parser for interpreting commands from the application program;

a BLTBIT engine;

a first operating register for receiving commands from the operating system and operating the BLTBIT engine according to the received commands;

a second operating register for receiving selected commands from the command parser and operating the BLTBIT engine according to the selected commands;

signaling bits associated with the first and second operating registers; and arbitration logic coupled to the signaling bits and to the first and second operating registers, for coupling commands from the first or second operating register to the BLTBIT engine according to an arbitration scheme.

12. A method for concurrently processing commands from an operating system and an application program in a graphics controller having a command parser for routing commands to graphics resources, including a BLTBIT engine, the method comprising the steps of:

receiving commands from the operating system in a first register associated with the BLTBIT engine;

setting a request bit when the command received in the first register is a BLTBIT command;

receiving a command from the application program in a first buffer associated with the command parser;

setting a request bit when the command parser detects a BLTBIT command in the first buffer;

gating the commands in the first register and first buffer to the BLTBIT engine according to an arbitration scheme.

13. The method of claim 12, wherein the step of setting a request bit when the command parser detects a BLTBIT command in the first buffer comprises the subsets of:

coupling the BLTBIT command to a second register associated with the BLTBIT engine; and setting a request bit associated with the second register.

14. The method of claim 12, wherein the step of gating the commands comprises the substeps of:

gating the command in the first register to the BLTBIT engine when the BLTBIT engine is not busy; and gating the command in the buffer to the BLTBIT engine when the BLTBIT engine is not busy and the request bit associated with the first register is not set.

* * * * *

UNITED STATES PATENT AND TRADEMARK OFFICE

CERTIFICATE OF CORRECTION

PATENT NO. : 5,861,893
DATED : January 19, 1999
INVENTOR(S) : Sturgess

It is certified that error appears in the above-identified patent and that said Letters Patent is hereby corrected as shown below:

<u>Column 1,</u>
Line 12, delete "modem" and insert -- modern --.

<u>Column 5,</u>
Line 63, delete "DD1260" and insert -- DDI260 --.

Signed and Sealed this

Twenty-fifth Day of November, 2003

JAMES E. ROGAN
*Director of the United States Patent and Trademark Office*